United States Patent
Lee et al.

(10) Patent No.: US 10,126,774 B2
(45) Date of Patent: Nov. 13, 2018

(54) SEMICONDUCTOR CHIP AND ELECTRONIC APPARATUS INCLUDING THE SAME

(71) Applicant: SAMSUNG ELECTRONICS CO., LTD., Suwon-si, Gyeonggi-do (KR)

(72) Inventors: Jae Won Lee, Seoul (KR); Jae Su Jung, Suwon-si (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 0 days.

(21) Appl. No.: 15/666,647

(22) Filed: Aug. 2, 2017

(65) Prior Publication Data

US 2018/0188761 A1    Jul. 5, 2018

(30) Foreign Application Priority Data

Jan. 4, 2017  (KR) .................. 10-2017-0001249

(51) Int. Cl.
| | |
|---|---|
| *G05F 1/20* | (2006.01) |
| *H03L 7/00* | (2006.01) |
| *G05F 3/02* | (2006.01) |
| *G06F 9/4401* | (2018.01) |

(52) U.S. Cl.
CPC ............ *G05F 3/02* (2013.01); *G06F 9/4411* (2013.01)

(58) Field of Classification Search
CPC ................................ G05F 3/02; G06F 9/4411
USPC .................. 327/524, 540, 306; 713/300, 320
See application file for complete search history.

(56) References Cited

U.S. PATENT DOCUMENTS

| | | | |
|---|---|---|---|
| 7,818,590 B2 | 10/2010 | Yang | |
| 7,921,312 B1 | 4/2011 | Pennanen et al. | |
| 8,010,317 B1* | 8/2011 | Pennanen | G06F 1/3203 |
| | | | 702/182 |
| 8,572,426 B2 | 10/2013 | Chan et al. | |
| 8,994,447 B2 | 3/2015 | Xie et al. | |
| 8,997,447 B2* | 4/2015 | Yaske | A01D 78/14 |
| | | | 56/367 |
| 2007/0139097 A1* | 6/2007 | Yang | G11C 5/14 |
| | | | 327/530 |
| 2015/0226790 A1 | 8/2015 | Chen et al. | |
| 2016/0116956 A1 | 4/2016 | Kim et al. | |

* cited by examiner

*Primary Examiner* — Dinh T Le
(74) *Attorney, Agent, or Firm* — F. Chau & Associates, LLC

(57) ABSTRACT

A semiconductor chip includes a hardware performance monitor (HPM) unit and an HPM controller. The HPM unit is driven during an initial operation period, a first operation period, and a second operation period, outputs initial HPM data, first HPM data, and second HPM data in the initial operation period, the first operation period, and the second operation period, respectively. The HPM controller performs a first compensation operation of compensating a driving voltage of the semiconductor chip using the initial HPM data and the first HPM data, and a second compensation operation of compensating the driving voltage using the initial HPM data and the second HPM data. The HPM unit provides the initial HPM data, the first HPM data, and the second HPM data, which are correlated with performance of the semiconductor chip, to the HPM controller in a first mode, and does not provide this data in a second mode.

20 Claims, 11 Drawing Sheets

1400

SEMICONDUCTOR CHIP AND ELECTRONIC APPARATUS INCLUDING THE SAME

This application claims priority under 35 U.S.C. § 119 to Korean Patent Application No. 10-2017-0001249, filed on Jan. 4, 2017 in the Korean Intellectual Property Office, the disclosure of which is incorporated by reference herein in its entirety.

TECHNICAL FIELD

Exemplary embodiments of the present inventive concept relate to a semiconductor chip and an electronic apparatus including the same.

DISCUSSION OF RELATED ART

Recently, reducing power consumption, such as battery usage time, in an electronic apparatus, such as a mobile product, has become increasingly desirable. To reduce power consumption in an electronic apparatus, unnecessary margins may be removed. To effectively remove unnecessary margins, performance information of a semiconductor chip included in the electronic apparatus should be accurately determined. Accordingly, compensating a driving voltage of the semiconductor chip in accordance with the performance information of the semiconductor chip may help to reduce power consumption.

SUMMARY

According to an exemplary embodiment of the present inventive concept, a semiconductor chip includes a hardware performance monitor (HPM) unit and an HPM controller. The HPM unit is disposed in the semiconductor chip, and configured to be driven during an initial operation period, a first operation period, and a second operation period, which do not overlap one another, and to output initial HPM data, the first HPM data, and the second HPM data in the initial operation period, the first operation period, and the second operation period, respectively. The HPM controller is disposed in the semiconductor chip, and configured to receive the initial HPM data from the HPM unit in the initial operation period and store the received initial HPM data in a storage unit, to perform a first compensation operation of receiving the first HPM data in the first operation period and compensating a driving voltage of the semiconductor chip using the initial HPM data, and to perform a second compensation operation of receiving the second HPM data in the second operation period and compensating the driving voltage of the semiconductor chip using the initial HPM data. A first voltage, which is different from the driving voltage, is supplied to the semiconductor chip in the initial operation period, the first operation period, and the second operation period. The HPM unit is turned on in the initial operation period, the first operation period, and the second operation period. The HPM unit provides the initial HPM data, the first HPM data, and the second HPM data, which are correlated with performance of the semiconductor chip, to the HPM controller in a first mode. The HPM unit does not provide the initial HPM data, the first HPM data, and the second HPM data to the HPM controller in a second mode.

According an exemplary embodiment of the present inventive concept, an electronic apparatus includes a semiconductor chip configured to operate in first and second sections and a kernel configured to provide, to the semiconductor chip, a booting voltage for booting the electronic apparatus during a first booting period of the electronic apparatus and a driving voltage for driving the semiconductor chip after the first booting period during a first driving period of the electronic apparatus. The semiconductor chip includes a hardware performance monitor (HPM) unit configured to output first HPM data in the first section and a HPM controller configured to receive the first HPM data from the HPM unit and output one of a first compensation signal for compensating the driving voltage of the semiconductor chip or a second compensation signal for maintaining the driving voltage of the semiconductor chip using the initial HPM data. The booting voltage includes first and second voltages. The first booting period includes the first section in which the first voltage is provided from the kernel and a third section, which is a part of the second section, in which the second voltage is provided from the kernel. The second section includes a fourth section, which is a remaining part of the second section excluding the third section.

According to an exemplary embodiment of the present inventive concept, a method of operating an electronic apparatus including a semiconductor chip includes determining whether booting of the electronic apparatus is initial booting, extracting initial hardware performance monitor (HPM) data and storing the initial HPM data in a first section of an initial booting period when it is determined that the booting of the electronic apparatus is initial booting, extracting first HPM data and storing the first HPM data in a first section of a first booting period when it is determined that the booting of the electronic apparatus is not the initial booting, and outputting one of a first compensation signal and a second compensation signal using the initial HPM data and the first HPM data. The first booting period is after the initial booting period. A driving voltage of the semiconductor chip is compensated in response to the first compensation signal. The driving voltage of the semiconductor chip is maintained in response to the second compensation signal.

BRIEF DESCRIPTION OF THE DRAWINGS

The above and other aspects and features of the present inventive concept will become more apparent by describing in detail exemplary embodiments thereof with reference to the attached drawings.

DETAILED DESCRIPTION OF THE EMBODIMENTS

Figure 1:
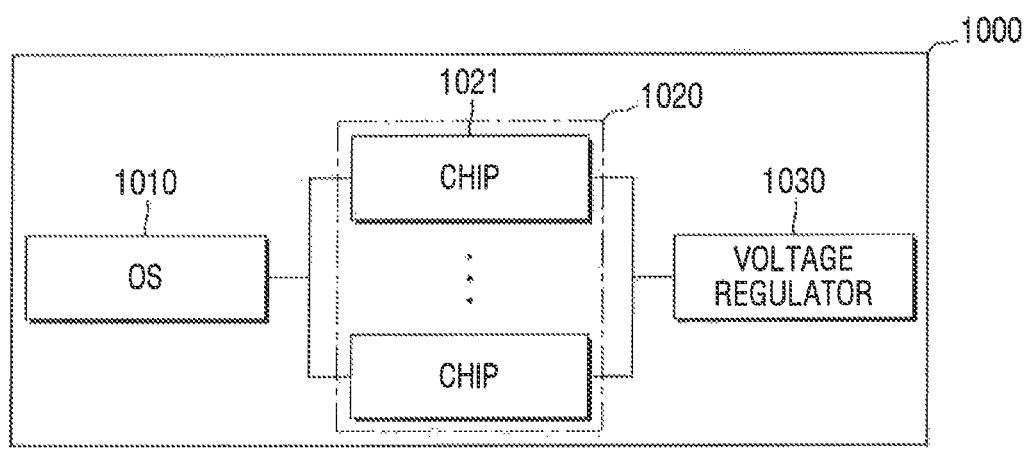
FIG. 1 is a block diagram of an electronic apparatus according to an exemplary embodiment of the present inventive concept.

Exemplary embodiments of the present inventive concept will be described hereinafter with reference to the accompanying drawings. Like reference numerals may refer to like elements throughout this application.

Exemplary embodiments of the present inventive concept provide a semiconductor chip for accurately compensating a driving voltage using initial hardware performance monitor (HPM) data, and an electronic apparatus including the same.

Exemplary embodiments of the present inventive concept provide a semiconductor chip, which can reduce power consumption by minimally compensating a driving voltage using the initial HPM data, and an electronic apparatus including the same.

Exemplary embodiments of the present inventive concept provide a semiconductor chip for determining aging thereof by measuring HPM data under the same voltage, and an electronic apparatus including the same.

Hereinafter, a semiconductor chip and an electronic apparatus including the same, according to an exemplary embodiment of the present inventive concept, will be described with reference to FIGS. 1 to 3.

FIG. 1 is a block diagram of an electronic apparatus according to an exemplary embodiment of the present inventive concept. FIG. 2 is a block diagram illustrating a semiconductor chip of FIG. 1 according to an exemplary embodiment of the present inventive concept. FIG. 3 is a block diagram illustrating an HPM unit of FIG. 2 according to an exemplary embodiment of the present inventive concept.

Referring to FIG. 1, an electronic apparatus 1000 may include an operating system (OS) 1010, a plurality of semiconductor chips 1020, and a voltage regulator 1030. The plurality of semiconductor chips 1020 includes a semiconductor chip 1021, which will be described in detail below.

The operating system 1010 may include, for example, a kernel. The kernel of the operating system 1010 may boot and drive the electronic apparatus 1000. For example, the kernel of the operating system 1010 may provide a booting voltage to the electronic apparatus 1000, for booting the electronic apparatus 1000. In addition, the kernel of the operating system 1010 may provide a driving voltage to the electronic apparatus 1000, for driving the electronic apparatus 1000. Here, the driving voltage may be different or the same for each component (for example, the semiconductor chips 1020) included in the electronic apparatus 1000. The kernel of the operating system 1010 may provide various driving voltages to each of a plurality of components included in the electronic apparatus 1000.

Although it is shown in FIG. 1 that the electronic apparatus 1000 includes the operating system 1010, the plurality of semiconductor chips 1020, and the voltage regulator 1030, the present inventive concept is not limited thereto. For example, if necessary, the electronic apparatus 1000 may further include other units or components in addition to the units shown in FIG. 1.

The operating system 1010, the plurality of semiconductor chips 1020, and the voltage regulator 1030 may be electrically connected to one another. For example, the operating system 1010 may transmit an electrical signal to the voltage regulator 1030, and the voltage regulator 1030 may transmit a voltage or the like to the plurality of semiconductor chips 1020 according to the electrical signal.

Figure 2:
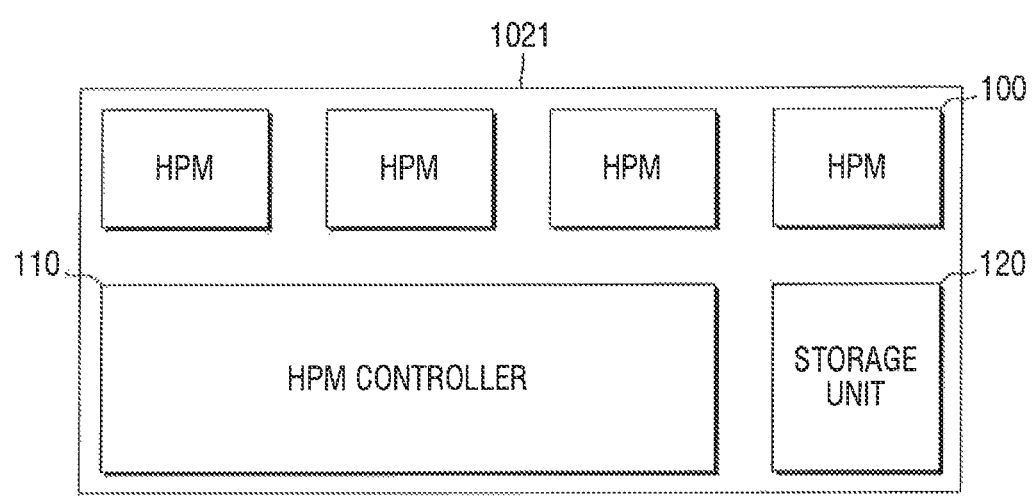
FIG. 2 is a block diagram illustrating a semiconductor chip of FIG. 1 according to an exemplary embodiment of the present inventive concept.

Referring to FIG. 2, each of the plurality of semiconductor chips 1020 of FIG. 1 may include an HPM unit (Hardware Performance Monitor unit) 100, an HPM controller 110, and a storage unit 120. Hereinafter, the semiconductor chip 1021 among the plurality of semiconductor chips 1020 will be described as an example. In an exemplary embodiment of the present inventive concept, each of the plurality of semiconductor chips 1020 may have substantially the same configuration as the semiconductor chip 1021.

Although it is shown in FIG. 2 that the semiconductor chip 1021 includes only the HPM unit 100, the HPM controller 110, and the storage unit 120, the present inventive concept is not limited thereto. For example, if necessary, the semiconductor chip 1021 may further include other units in addition to the units shown in FIG. 2.

For example, a plurality of HPM units 100 may be arranged in the semiconductor chip 1021. The HPM unit 100 may reflect the performance of the semiconductor chip 1021 in real time according to, for example, voltage and temperature, and may output HPM data. The performance of different regions of the semiconductor chip 1021 may be measured by the HPM units 100 located in different regions of the semiconductor chip 1021. Here, the voltage may be, for example, a threshold voltage of a transistor included in the region of the semiconductor chip 1021 where the HPM units 100 are arranged.

The HPM data, which is an output of the HPM unit 100 generated from silicon, may be represented as a performance function for predicting the performance of the semiconductor chip 1021 by using linear or polynomial regression to derive the performance function according to the correlation between the HPM data and the performance of the semiconductor chip 1021.

In other words, the HPM data may be a value that reflects information about speed, temperature, a drive voltage, or a transistor threshold voltage, which can indicate the performance of the semiconductor chip 1021.

For example, the correlation between the HPM data and the performance of the semiconductor chip 1021 may be obtained by comparing the HPM data for the semiconductor chip 1021 to which a normal driving voltage is applied with the HPM data for the semiconductor chip 1021 measured in a state where the semiconductor chip 1021 is intentionally deteriorated. The state where the semiconductor chip 1021 is intentionally deteriorated may be a case where a driving voltage exceeding a normal driving voltage range is intentionally applied to the semiconductor chip 1021.

When the HPM data for the semiconductor chip 1021 that is intentionally deteriorated is changed compared to the HPM data for the semiconductor chip 1021 to which a normal driving voltage is applied, it can be determined that the driving voltage of the semiconductor chip 1021 needs to be increased in accordance with the change in the HPM data.

Figure 3:
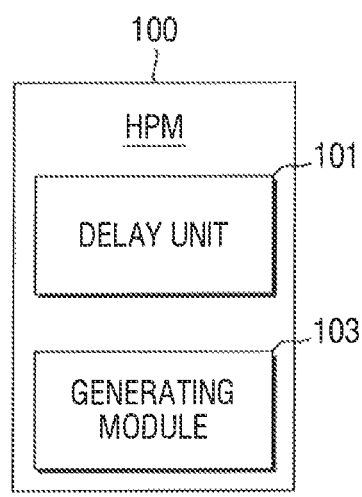
FIG. 3 is a block diagram illustrating a hardware performance monitor (HPM) unit of FIG. 2 according to an exemplary embodiment of the present inventive concept.

Referring to FIG. 2 with FIG. 3, the HPM unit 100 may include a delay unit 101 and a generating module 103.

When a clock signal is applied from the HPM controller 110, the generating module 103 may generate a pulse signal corresponding to the clock signal. The generated pulse signal may be provided to the delay unit 101. The delay unit 101 may perform a delay operation on the input pulse signal to generate the HPM data. In addition, the delay unit 101 may output the HPM data to the HPM controller 110.

However, the present inventive concept is not limited thereto. For example, the HPM unit 100 may generate HPM data through the above-described algorithm and output the HPM data to the HPM controller 110.

Referring to FIG. 2 again, the HPM controller 110 may be disposed in the semiconductor chip 1021. The HPM controller 110 may receive the HPM data from the HPM unit 100 and store the received HPM data in the storage unit 120. Furthermore, the HPM controller 110 may perform first and second compensation operations for compensating a driving voltage of the semiconductor chip 1021. The HPM controller 110 may generate any one of first or second compensation signals and output the generated signal to the voltage regulator 1030 of FIG. 1. Details of the function and operation of the HPM controller 110 will be described later.

The storage unit 120 may include the HPM data. Furthermore, the storage unit 120 may maintain the stored HPM data even when the electronic apparatus 1000 is powered-off. In other words, the storage unit 120 may be a nonvolatile memory device.

Hereinafter, the operations of a semiconductor chip and an electronic apparatus including the semiconductor chip, according to an exemplary embodiment of the present inventive concept, will be described with reference to FIGS. 1, 2, and 4 to 9. For the sake of clarity, repeat descriptions will be omitted.

Figure 4:
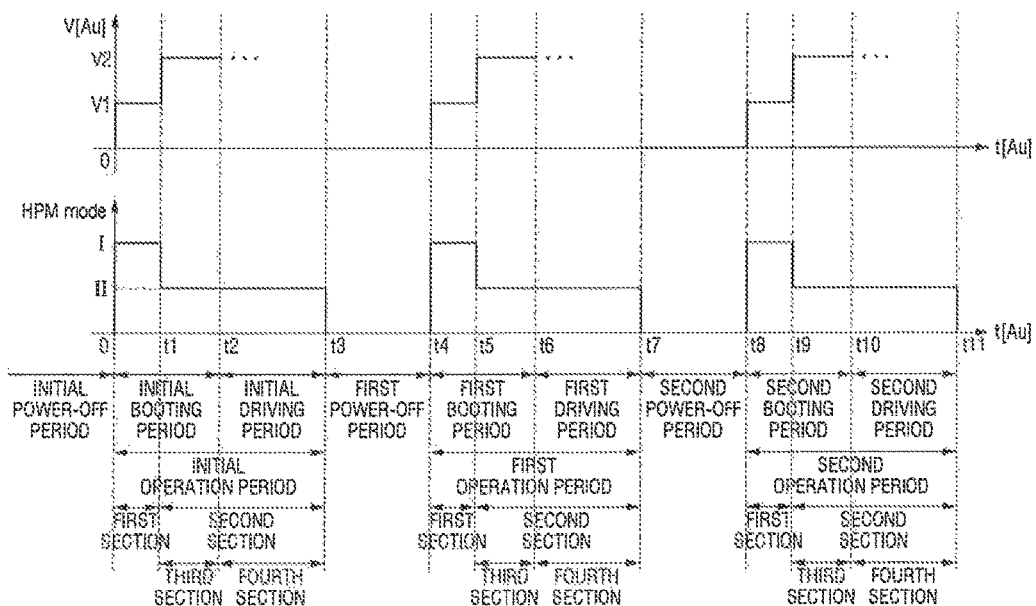
FIG. 4 is a timing diagram for explaining operations of the semiconductor chip of FIG. 2 according to an exemplary embodiment of the present inventive concept.
Figure 5:
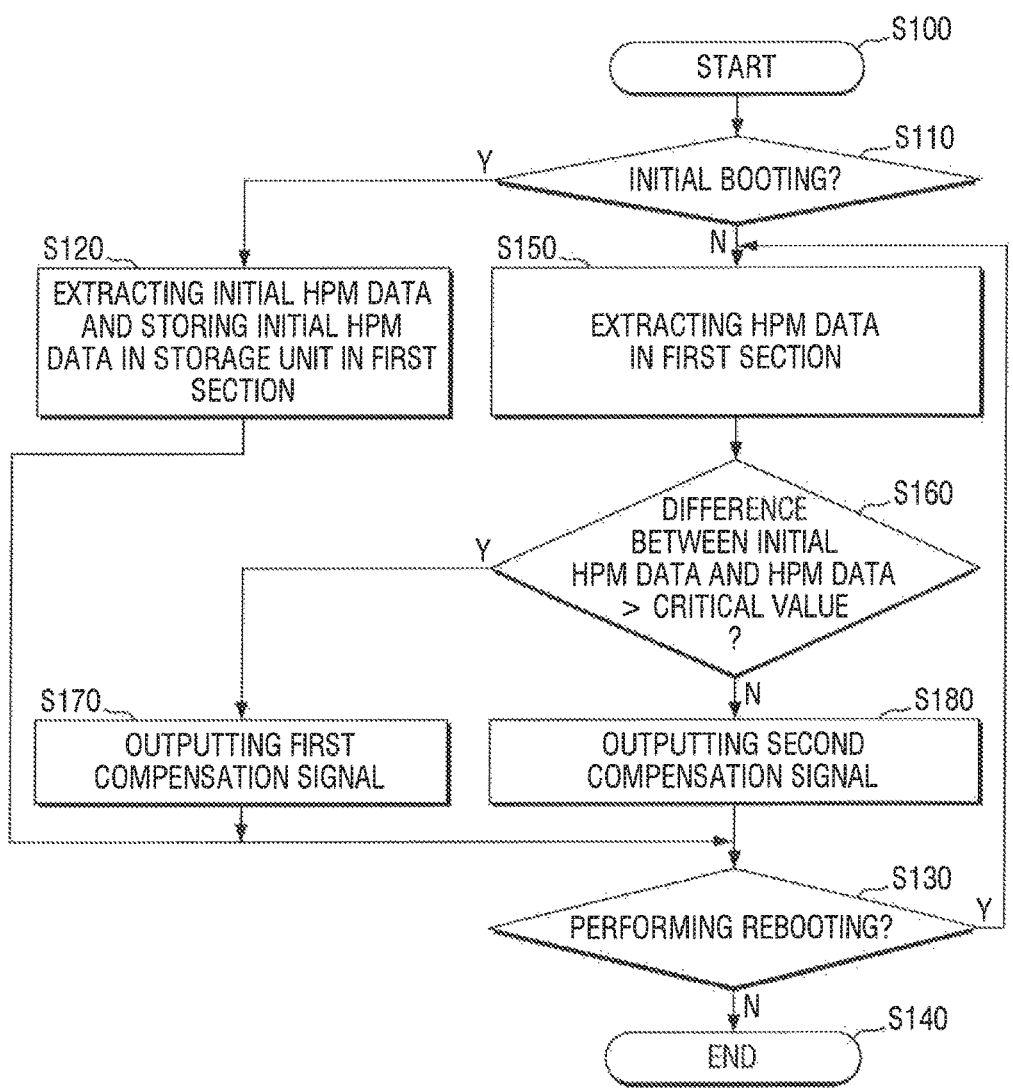
FIG. 5 is a flowchart for explaining operations of the semiconductor chip of FIG. 2 according to an exemplary embodiment of the present inventive concept.
Figure 6:
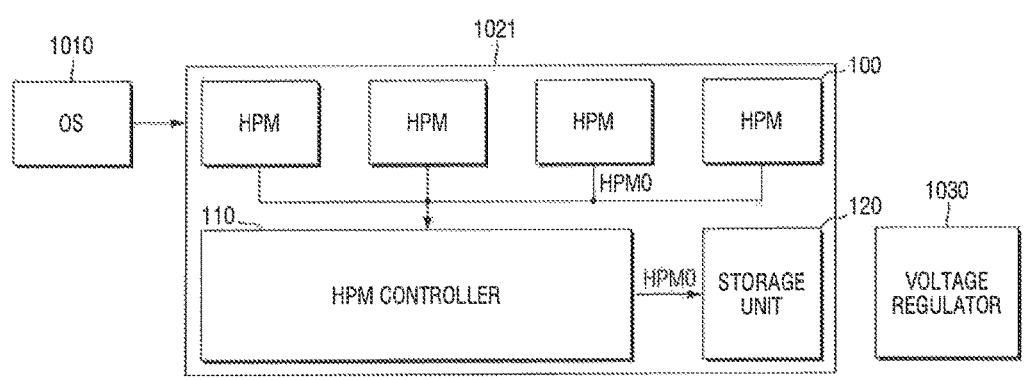
FIG. 6 is a block diagram for explaining operations of the HPM unit of FIG. 3 in a first mode during an initial operation period according to an exemplary embodiment of the present inventive concept.
Figure 7:
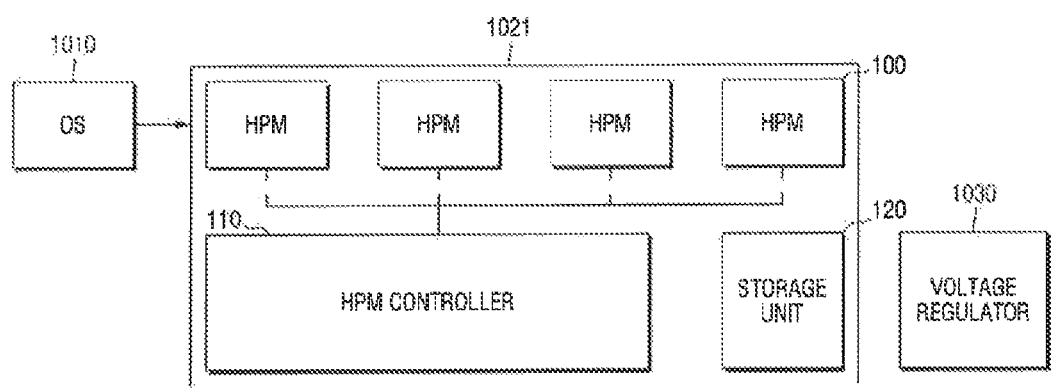
FIG. 7 is a block diagram for explaining operations of the HPM unit of FIG. 3 in a second mode during the initial operation period according to an exemplary embodiment of the present inventive concept.
Figure 8:
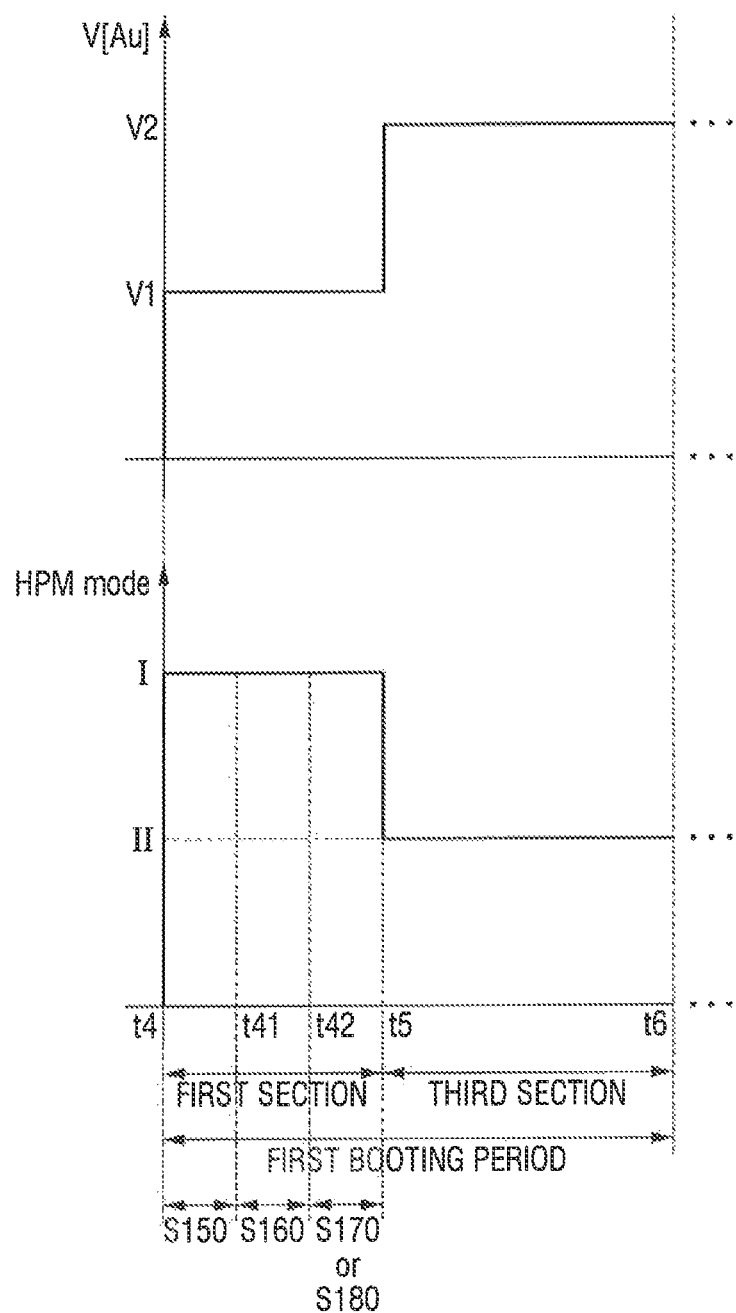
FIG. 8 is an enlarged view for explaining a first operation period of FIG. 4 according to an exemplary embodiment of the present inventive concept.
Figure 9:
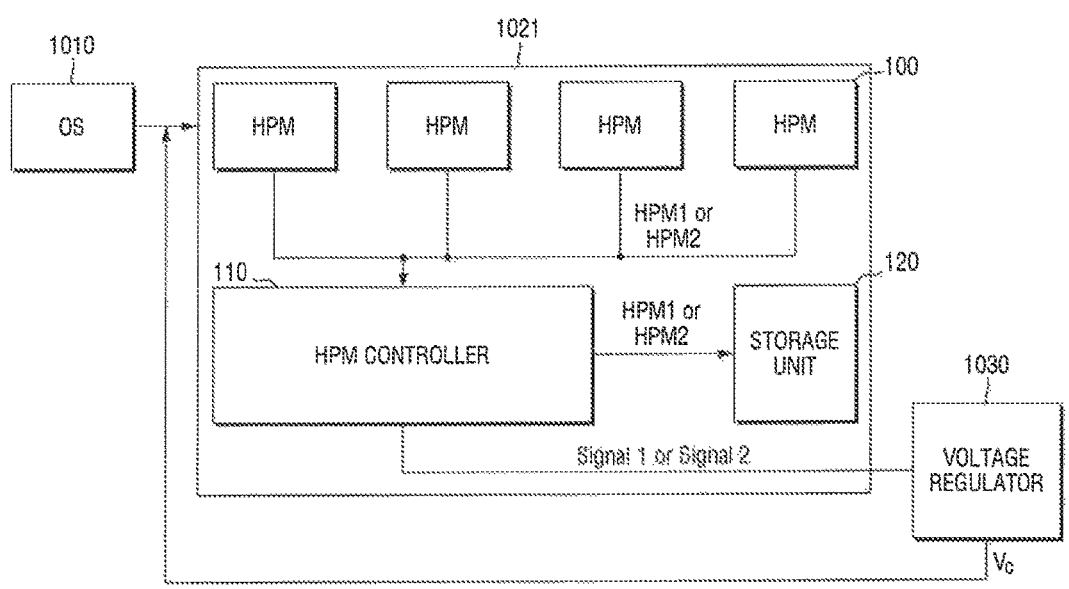
FIG. 9 is a block diagram for explaining operations of the semiconductor chip of FIG. 2 in first and second operation periods according to an exemplary embodiment of the present inventive concept.

FIG. 4 is a timing diagram for explaining operations of the semiconductor chip of FIG. 2 according to an exemplary embodiment of the present inventive concept. FIG. 5 is a flowchart for explaining operations of the semiconductor chip of FIG. 2 according to an exemplary embodiment of the present inventive concept. FIG. 6 is a block diagram for explaining operations of the HPM unit of FIG. 3 in a first mode during an initial operation period according to an exemplary embodiment of the present inventive concept. FIG. 7 is a block diagram for explaining operations of the HPM unit of FIG. 3 in a second mode during the initial operation period according to an exemplary embodiment of the present inventive concept. FIG. 8 is an enlarged view for explaining a first operation period of FIG. 4 according to an exemplary embodiment of the present inventive concept. FIG. 9 is a block diagram for explaining operations of the semiconductor chip of FIG. 2 in first and second operation periods according to an exemplary embodiment of the present inventive concept.

Referring to FIGS. 1 and 4, the upper graph of FIG. 4 shows a graph related to voltages provided to the plurality of semiconductor chips 1020 by the kernel of the operating system 1010. Here, the x axis indicates time (t[Au]), and the y axis indicates voltage (V[Au]). In FIG. 4, since each of the plurality of semiconductor chips 1020 included in the electronic apparatus 1000 has various driving voltages, the graphical diagrams between the second time t2 and the third time t3, between the sixth time t6 and the seventh time t7, and between the tenth time t10 and the eleventh time t11 are omitted for clarity.

The lower graph of FIG. 4 is a graph related to a mode in which the HPM unit 100 operates. Here, the x axis indicates time, and the y axis indicates mode.

Referring to FIGS. 1, 2, and 4, the electronic apparatus 1000 may maintain a power-on state during an initial operation period, a first operation period, and a second operation period. The semiconductor chip 1021 may also be driven during the initial operation period, the first operation period, and the second operation period. Meanwhile, the electronic apparatus 1000 may maintain a power-off state during an initial power-off period, a first power-off period, and a second power-off period. The semiconductor chip 1021 may also be powered-off during the initial power-off period, the first power-off period, and the second power-off period.

The initial power-off period, the initial operation period, the first power-off period, the first operation period, the second power-off period, and the second operation period may be time periods that do not overlap one another.

The initial power-off period may be a period during which the semiconductor chip 1021 is mounted on the electronic apparatus 1000 and maintains the power-off state, e.g., a time period during which AC power is not supplied to the electronic apparatus 1000.

The initial power-off period may be, for example, a time period before shipment of the electronic apparatus 1000. The initial operation period is a time period during which AC power is supplied to the electronic apparatus 1000 for the first time after the semiconductor chip 1021 is mounted on the electronic apparatus 1000. The initial operation period may include an initial booting period and an initial driving period. The initial booting period may be a booting period that is first performed after the AC power is supplied to the electronic apparatus 1000. The initial driving period may be, for example, a period during which the electronic apparatus 1000 is first driven after the electronic apparatus 1000 is booted in the initial booting period. In the initial driving period, the semiconductor chip 1021 may be driven by a driving voltage.

The first power-off period may be a time period during which AC power is not supplied to the electronic apparatus 1000, after the initial operation period.

The first operation period may be a time period during which AC power is supplied to the electronic apparatus 1000 again, after the first power-off period. The first operation period may be, for example, a time period when the electronic apparatus 1000 is powered on by the user of the electronic apparatus 1000. The first operation period may include a first boot period and a first driving period. The first booting period may be, for example, a rebooting period. In other words, the first booting period may be a booting period performed when the electronic apparatus 1000 is powered on again by the user of the electronic apparatus 1000, after shipment of the electronic apparatus 1000. The first driving period may be, for example, a period during which the electronic apparatus 1000 is driven, after the electronic apparatus 1000 is booted in the first boot period. In the first driving period, the semiconductor chip 1021 may be driven by a driving voltage.

The second power-off period may be a time period during which AC power is not supplied to the electronic apparatus 1000 again, after the first operation period. The second power-off period may be, for example, a period when the electronic apparatus 1000 is powered off by the user of electronic apparatus 1000.

The second operation period may be a time period during which AC power is supplied to the electronic apparatus 1000 again, after the second power-off period. The second operation period may be, for example, a time period when the electronic apparatus 1000 is powered on by the user of the electronic apparatus 1000. The second operation period may include a second boot period and a second driving period. The second booting period may be, for example, a rebooting period. In other words, the second booting period may be a booting period performed when the electronic apparatus 1000 is powered on again by the user of the electronic apparatus 1000. The second driving period may be, for example, a period during which the electronic apparatus 1000 is driven, after the electronic apparatus 1000 is booted in the second boot period. In the second driving period, the semiconductor chip 1021 may be driven by a driving voltage.

The HPM unit 100 may maintain a turn-on state in the initial operation period, the first operation period, and the second operation period. In addition, the HPM unit 100 may maintain a turn-off state in the initial power-off period, the first power-off period, and the second power-off period. The HPM unit 100 may operate in a first mode (mode I) in a first section of each of the initial operation period, the first operation period and the second operation period, and may operate in a second mode (mode II) in a second section thereof. Here, the first section and the second section may be time sections that do not overlap.

The first section of the initial operation period may include a time point at which the initial operation period starts, after the initial power-off period. The first section of the first operation period may include a time point at which the first operation period starts, after the first power-off period. The first section of the second operation period may include a time point at which the second operation period starts, after the second power-off period.

Each of the booting periods, such as the initial booting period, the first booting period, and the second booting period, of the semiconductor chip 1021 may include the first section. For example, the initial booting period may be a period ranging from t=0 to second time t2, and the first section of the initial booting period may be a period ranging from t=0 to first time t1. For example, the first booting period may be a period ranging from fourth time t4 to sixth time t6, and the first section of the first booting period may be a period ranging from fourth time t4 to fifth time t5. For example, the second booting period may be a period ranging from eighth time t8 to tenth time t10, and the first section of the second booting period may be a period ranging from eighth time t8 to ninth time t9.

The ordinal number in the time variable may reflect time-series flow. As the ordinal number of the time variable increases, the time point may occur later with respect to t=0. For example, the fourth time t4 may be a time point that occurs after a predetermined time from the first time t1. For example, the fifth time t5 may be a time point between the fourth time t4 and the sixth time t6.

Meanwhile, each of the booting periods, such as the initial booting period, the first booting period, and the second booting period, of the semiconductor chip 1021 may include a third section that is a part of the second section. For example, the third section of the initial booting period may be a period from the first time t1 (which is a time point at which the first section has completed) to the second time t2. For example, the third section of the first booting period may be a period from the fifth time t5 to the sixth time t6. For example, the third section of the second booting period may be a period from the ninth time t9 to the tenth time t10.

A fourth section, which is a remaining section of the second section in each of the initial operation period, the first operation period, and the second operation period, may be the same as the initial driving period, the first driving period, and the second driving period, respectively.

When the HPM unit 100 operates in the first mode (mode I), the HPM unit 100 may generate and output HPM data correlated with the performance of the semiconductor chip 1021. In other words, in the first mode (mode I), the HPM unit 100 may provide the HPM data to the HPM controller 110.

When the HPM unit 100 operates in the second mode (mode II), the HPM unit 100 maintains a turn-on state, but may not output HPM data. In other words, the HPM unit 100 may not provide the HPM data to the HPM controller 110 in the second mode (mode II). In an exemplary embodiment of the present inventive concept, the HPM unit 100 may generate the HPM data in the second mode (mode II), but may not provide the HPM data to HPM controller 110. However, the present inventive concept is not limited thereto. For example, in an exemplary embodiment of the present inventive concept, the HPM unit 100 may maintain only the turn-on state without generating the HPM data in the second mode (mode II).

The HPM unit 100 maintains the turn-on state during the operation of the semiconductor chip 1021. However, the HPM unit 100 outputs the HPM data only in the first mode (mode I), and may not output the HPM data in the second mode (mode II). In other words, it is possible to check the performance of the semiconductor chip 1021 in real time and minimize the power consumption of the semiconductor chip 1021 by outputting the HPM data according to the mode, instead of continuously outputting the HPM data while the HPM unit 100 is turned on.

Referring to FIGS. 1, 2, and 4 to 7, operation of the electronic apparatus 1000 is started (operation S100). When the booting currently performed in operation S110 is an initial booting of the electronic apparatus 1000 (operation S110: Y), the HPM controller 110 may store initial HPM data (HPM0) in the storage unit 120 in operation S120. When the booting currently performed in operation S110 is not the initial booting of the electronic apparatus 1000 (operation S110: N), operation S150 may be performed, which will be described below. Here, the initial booting may mean that the electronic apparatus 1000 has entered the initial booting period.

For example, the kernel of the operating system 1010 may initially boot the electronic apparatus 1000 after the initial power-off period. In other words, the electronic apparatus 1000 may enter the initial operation period after the initial power-off period. The kernel of the operating system 1010 may provide a booting voltage to the semiconductor chip 1021 during the initial booting period to initially boot the electronic apparatus 1000.

The booting voltage may include a first voltage V1 and a second voltage V2. The second voltage V2 may be a voltage required for booting the electronic apparatus 1000. The first voltage V1, which is a voltage smaller than the second voltage V2, may be a voltage supplied to the semiconductor chip 300 for a short time period (e.g., the first section) before the second voltage V2 is supplied to the electronic apparatus 1000.

For example, the first voltage V1 may be provided to the semiconductor chip 1021 during the first section of the initial booting period, which is a section from t=0 to the first time t1. Furthermore, the second voltage V2 may be provided to the semiconductor chip 1021 during the third section of the initial booting period, which is a section from the first time t1 to the second time t2. The first voltage V1 may be a voltage different from the driving voltage provided to the semiconductor chip 1021 by the kernel of the operating system 1010 in the initial driving period, the first driving period, and the second driving period.

In the first section of the initial booting period, the HPM unit 100 may operate in the first mode (mode I). In other words, the HPM unit 100 may generate and output the initial HPM data HPM0 in the first section of the initial booting period, and provide the initial HPM data HPM0 to the HPM controller 110, as shown in FIG. 6.

The HPM controller 110 may receive the initial HPM data HPM0 from the HPM unit 100 in the first section of the initial booting period, and may store the initial HPM data HPM0 in the storage unit 120.

After the storage of the initial HPM data HPM0 is completed, in the third section of the initial booting period, the kernel of the operating system 1010 may provide the second voltage V2 to the semiconductor chip 1021. At the first time t1, the HPM unit 100 may be switched to the second mode (mode II). When the HPM unit 100 is in the second mode (mode II), as shown in FIG. 7, the HPM data may not be provided to the HPM controller 110 from the HPM unit 100.

During the third section of the initial booting period, the initial booting of the electronic apparatus 1000 may be completed. Thus, the initial booting period (the time period from t=0 to the first time t1) may end.

After the initial booting of the electronic apparatus 1000 is completed, the kernel of the operating system 1010 may provide a driving voltage to the semiconductor chip 1021 to drive the semiconductor chip 1021. In other words, during the initial driving period (e.g., the fourth section), the driving voltage may be applied to the semiconductor chip 1021. At this time, the HPM unit 100 may maintain the second mode (mode II). The driving voltage applied to the semiconductor chip 1021 in the initial driving period may be an initial driving voltage without compensation.

At the third time t3, the electronic apparatus 1000 may enter the first power-off period. At this time, the driving voltage may not be provided to the semiconductor chip 1021, and the HPM unit 100 may be turned off. In the first power-off period, the storage unit 120 may maintain the storage state of the initial HPM data HPM0 that was stored in the first section of the initial operation period.

Referring to FIGS. 1, 2, 4, 5, 8, and 9, after operation S120, when the rebooting of the electronic apparatus 1000 is performed (operation S130: Y), the HPM controller 110 may receive first HPM data HPM1 from the HPM unit 100 in the first section of the first operation period (operation S150). Here, rebooting may indicate that the electronic apparatus 1000 has entered the first booting period. As described above, operation S150 may also be performed when the booting of the electronic apparatus 1000 is not the initial booting (e.g., operation S110:N, after operation S100).

For example, the kernel of the operating system 1010 may reboot the electronic apparatus 1000 after the first power-off period. In other words, the electronic apparatus 1000 may enter the first operation period after the first power-off period. The kernel of the operating system 1010 may provide a booting voltage to the semiconductor chip 1021 during the first booting period to reboot the electronic apparatus 1000.

For example, the first voltage V1 may be provided to the semiconductor chip 1021 during the first section of the first booting period, which is a period from the fourth time t4 to the fifth time t5. Furthermore, the second voltage V2 may be provided to the semiconductor chip 1021 during the third section of the first booting period, which is a period from the fifth time t5 to the sixth time t6.

In the first section of the first booting period, the HPM unit 100 may operate in the first mode (mode I). In other words, the HPM unit 100 may generate and output the first HPM data HPM1 in the first section of the first booting period, and provide the first HPM data HPM1 to the HPM controller 110. The initial HPM data HPM0 and the first HPM data HPM1 may be values generated under the first voltage V1. For example, as shown in FIG. 8, in the period from the fourth time t4 to a time t41, the HPM controller 110 receives the first HPM data HPM1 from the HPM unit 100 (operation S150).

In an exemplary embodiment of the present inventive concept, the HPM controller 110 may store the first HPM data HPM1 in the storage unit 120 in the first section of the first booting period.

In the first section of the first booting period, the HPM controller 110 receives the first HPM data HPM1 from the HPM unit 100, and then operation S160 may be performed. In operation S160, the HPM controller 110 may compare the difference between the initial HPM data HPM0 and first HPM data HPM1 with a predetermined critical value. For example, as shown in FIG. 8, in the period from the time t41 to a time t42, the HPM controller 110 may perform the comparison of the difference between the initial HPM data HPM0 stored in the storage unit 120 and the first HPM data HPM1 provided in the first section of the first booting period with the critical value.

In the first section of the first booting period, when the difference between the initial HPM data HPM0 and the first HPM data HPM1 is greater than the critical value, the HPM controller 110 may perform operation S170. In other words, the HPM controller 110 may perform a first compensation operation by outputting a first compensation signal (Signal 1) to the voltage regulator 1030. For example, as shown in FIGS. 8 and 9, in the period from the time t42 to the 5th time t5, the HPM controller 110 may output the first compensation signal (Signal 1) to the voltage regulator 1030 (operation S170). The first compensation operation may include an operation of increasing the driving voltage of the semiconductor chip 1021.

In the first section of the first booting period, when the difference between the initial HPM data HPM0 and the first HPM data HPM1 is less than or equal to the critical value, the HPM controller 110 may perform operation S180. In operation S180, the HPM controller 110 may not perform the first compensation operation by outputting a second compensation signal (Signal 2) to the voltage regulator 1030. In other words, the HPM controller 110 may maintain the driving voltage of the semiconductor chip 1021 by not performing the first compensation operation. For example, as shown in FIGS. 8 and 9, in the period from the time t42 to the 5th time t5, the HPM controller 110 may output the second compensation signal (Signal 2) to the voltage regulator 1030 (operation S180).

In the third section of the first booting period, the kernel of the operating system 1010 may provide the second voltage V2 to the semiconductor chip 1021. At the fifth time t5, the HPM unit 100 may be switched to the second mode (mode II).

During the third section of the first booting period, the rebooting of the electronic apparatus 1000 may be completed. In other words, the first booting period (the time period from the fourth time t4 to the sixth time t6) may end.

After the first booting period has passed and the rebooting of the electronic apparatus 1000 has been completed, the kernel of the operating system 1010 may provide a driving voltage to the semiconductor chip 1021 to drive the semiconductor chip 1021. In other words, the driving voltage may be applied to the semiconductor chip 1021 during the first driving period (e.g., the fourth section). At this time, the HPM unit 100 may maintain the second mode (mode II).

When the HPM controller 110 outputs the first compensation signal (Signal 1) to the voltage regulator 1030 in the first section of the first booting period, the voltage regulator 1030 may output a compensation voltage Vc. The compensation voltage Vc may be provided to the semiconductor chip 1021.

In this case, during the first driving period, the semiconductor chip 1021 may receive both the driving voltage provided from the kernel of the operating system 1010 and the compensation voltage Vc provided from the voltage regulator 1030. In other words, the compensation voltage Vc may be added to the driving voltage of the semiconductor chip 1021, and then provided to the semiconductor chip 1021. Therefore, the semiconductor chip 1021 may be driven by a compensated driving voltage in the first driving period, unlike in the initial driving period.

When the HPM controller 110 outputs the second compensation signal (Signal 2) to the voltage regulator 1030 in the first section of the first booting period, the voltage regulator 1030 may not output the compensation voltage Vc. In this case, during the first driving period, the semiconductor chip 1021 receives only the driving voltage provided from the kernel of the operating system 1010, and may not receive the compensation voltage Vc. In other words, the driving voltage of the semiconductor chip 1021 may be maintained. Therefore, the semiconductor chip 1021 may be driven by the driving voltage in the first driving period as well as in the initial driving period.

At the seventh time t7, the electronic apparatus 1000 may enter the second power-off period. At this time, the driving voltage may not be provided to the semiconductor chip 1021, and the HPM unit 100 may be turned off. In the second power-off period, the storage unit 120 may maintain not only the storage state of the initial HPM data HPM0 that was stored in the first section of the initial operation period but also the storage state of the first HPM data HPM1 that was stored in the first section of the first operation period.

After the operation S170 or the operation S180 is performed, when the electronic apparatus 1000 is booted, it may be determined whether the rebooting of the electronic apparatus 1000 is performed (operation S130).

When the rebooting of the electronic apparatus 1000 is not performed (operation S130: N), the operation thereof may be completed (operation S140).

As described above, when the rebooting of the electronic apparatus 1000 is performed (operation S130: Y), the HPM controller 110 may perform operation S150 again. In this case, the electronic apparatus 1000 may enter the second booting period.

The kernel of the operating system 1010 may reboot the electronic apparatus 1000 after the second power-off period. In other words, the electronic apparatus 1000 may enter the second operation period after the second power-off period. The kernel of the operating system 1010 may provide a booting voltage to the semiconductor chip 1021 during the second booting period to reboot the electronic apparatus 1000.

For example, the first voltage V1 may be provided to the semiconductor chip 1021 during the first section of the second booting period, which is a period from the eighth time t8 to the ninth time t9. Furthermore, the second voltage V2 may be provided to the semiconductor chip 1021 during the third section of the second booting period, which is a period from the ninth time t9 to the tenth time t10.

In the first section of the second booting period, the HPM unit 100 may operate in the first mode (mode I). In other words, the HPM unit 100 may generate and output second HPM data HPM2 in the first section of the second booting period, and provide the second HPM data HPM2 to the HPM controller 110. Thus, in addition to the initial HPM data HPM0 and the first HPM data HPM1, the second HPM data HPM2 may also be a value generated under the first voltage V1.

In an exemplary embodiment of the present inventive concept, the HPM controller 110 may store the second HPM data HPM2 in the storage unit 120 in the first section of the second booting period. Accordingly, the HPM controller 110 may store the HPM data, generated in the first section of each booting period, in the storage unit 120, thus recording a history of a degree of aging of the semiconductor chip 1021. Since the HPM data generated in the first section of each booting period is data generated under substantially the same conditions, the degree of aging of the semiconductor chip 1021 may be gauged with relative accuracy.

In the first section of the second booting period, the HPM controller 110 receives the second HPM data HPM2 from the HPM unit 100, and then operation 160 (S160) may be performed. In other words, the HPM controller 110 may compare the difference between the initial HPM data HPM0 and the second HPM data HPM2 stored in the storage unit 120 with the critical value (operation S160).

The HPM controller 110 may determine the degree of aging of the semiconductor chip 1021 by using the HPM data generated under the same voltage (e.g., the first voltage V1). In addition, the HPM controller 110 may compensate the driving voltage of the semiconductor chip 1021 to reflect the degree of aging of the semiconductor chip 1021 obtained by comparing the initial HPM data HPM0 generated under the same voltage (e.g., the first voltage V1) with the first and second HPM data HPM1 and HPM2.

Moreover, the HPM controller 110 can increase the accuracy of a comparison reference value, such as the initial HPM data HPM0, compared to a preset value, by compensating the drive voltage of the semiconductor chip 1021 based on the initial HPM data HPM0 measured after the semiconductor chip 1021 is mounted on the electronic apparatus 1000. Since the comparison reference value is set after the semiconductor chip 1021 is mounted on the electronic apparatus 1000, the environmental difference may be reduced as compared with using a preset value before the semiconductor chip 1021 is mounted to the electronic apparatus 1000. In other words, in this case, due to the reduction of the environmental difference, accurate compensation for the driving voltage of the semiconductor chip 1021 may be achieved. Furthermore, due to the reduction of the environmental difference, it is possible to prevent an increase in power consumption by minimally compensating the driving voltage of the semiconductor chip 1021.

In the first section of the second booting period, when the difference between the initial HPM data HPM0 and the second HPM data HPM2 is greater than the critical value, the HPM controller 110 may perform operation S170. In other words, the HPM controller 110 may perform a second compensation operation by inputting the first compensation signal (Signal 1) to the voltage regulator 1030. The second compensation operation may include an operation of increasing the driving voltage of the semiconductor chip 1021.

In the first section of the second booting period, when the difference between the initial HPM data HPM0 and the second HPM data HPM1 is less than or equal to the critical value, the HPM controller 110 may perform operation S180. The HPM controller 110 may not perform the second compensation operation by inputting the second compensation signal (Signal 2) to the voltage regulator 1030. In other words, the HPM controller 110 may maintain the driving voltage of the semiconductor chip 1021 by not performing the second compensation operation.

In the third section of the second booting period, the kernel of the operating system 1010 may provide the second voltage V2 to the semiconductor chip 1021. At the ninth time t9, the HPM unit 100 may be switched to the second mode (mode II).

During the third section of the second booting period, the rebooting of the electronic apparatus 1000 may be completed. In other words, the second booting period (the time period from the eighth time t8 to the tenth time t10) may end.

After the second booting period has passed and the rebooting of the electronic apparatus 1000 has been completed, the kernel of the operating system 1010 may provide a driving voltage to the semiconductor chip 1021 to drive the semiconductor chip 1021. In other words, the driving voltage may be applied to the semiconductor chip 1021 during the second driving period (e.g., the fourth section). At this time, the HPM unit 100 may maintain the second mode (mode II).

When the HPM controller 110 outputs the first compensation signal (Signal 1) to the voltage regulator 1030 in the first section of the second booting period, the voltage regulator 1030 may output the compensation voltage Vc. The compensation voltage Vc may be provided to the semiconductor chip 1021.

In this case, during the second driving period, the semiconductor chip 1021 may receive both the driving voltage provided from the kernel of the operating system 1010 and the compensation voltage Vc provided from the voltage regulator 1030. In other words, the compensation voltage Vc may be added to the driving voltage of the semiconductor chip 1021, and then provided to the semiconductor chip 1021. Therefore, the semiconductor chip 1021 may be driven by the compensated driving voltage in the second driving period, unlike in the initial driving period. The compensation voltage Vc in the first driving period may be the same as or different from the compensation voltage Vc in the second driving period.

When the HPM controller 110 outputs the second compensation signal (Signal 2) to the voltage regulator 1030 in the first section of the second booting period, the voltage regulator 1030 may not output the compensation voltage Vc. In this case, during the second driving period, the semiconductor chip 1021 receives only the driving voltage provided from the kernel of the operating system 1010, and may not receive the compensation voltage Vc. In other words, the driving voltage of the semiconductor chip 1021 may be maintained. Therefore, the semiconductor chip 1021 may be driven by the driving voltage in the second driving period as well as in the initial driving period.

Hereinafter, semiconductor systems that may include a semiconductor chip and an electronic apparatus including the same according to exemplary embodiments of the present inventive concept will be described with reference to FIGS. 10 to 12.

Figure 10:
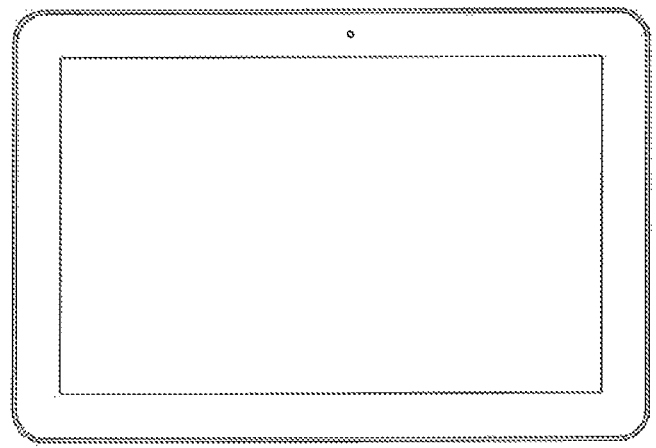
FIGS. 10 to 12 show a semiconductor system including a semiconductor chip and an electronic apparatus including the same according to exemplary embodiments of the present inventive concept.
Figure 11:
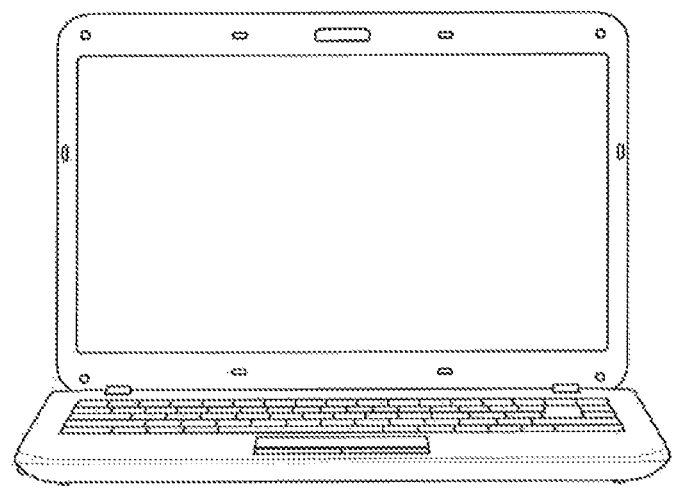
Figure 12:
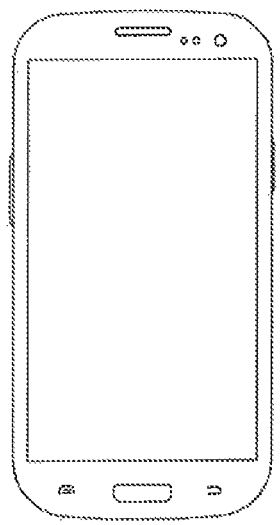

FIGS. 10 to 12 show a semiconductor system including a semiconductor chip and an electronic apparatus including the same according to exemplary embodiments of the present inventive concept.

FIG. 10 is a perspective view showing a tablet PC 1200, FIG. 11 is a perspective view showing a notebook computer 1300, and FIG. 12 is a perspective view showing a smart phone 1400. The aforementioned semiconductor chip and electronic apparatus including the same according to exemplary embodiments of the present inventive concept may be used in the tablet PC 1200, the notebook computer 1300, the smart phone 1400, or the like.

Furthermore, the aforementioned semiconductor chip and electronic apparatus including the same according to exemplary embodiments of the present inventive concept may also be applied to other integrated circuit devices.

In other words, although only the tablet PC 1200, the notebook PC 1300, and the smart phone 1400 are described and illustrated as examples of the semiconductor system, the present inventive concept is not limited thereto.

In exemplary embodiments of the present inventive concept, the semiconductor system may be implemented as an ultra mobile PC (UMPC), a work station, a net-book, a personal digital assistant (PDA), a portable computer, a wireless phone, a mobile phone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, a digital video player, etc.

While the present inventive concept has been particularly shown and described with reference to exemplary embodiments thereof, it will be understood by those of ordinary skill in the art that various changes in form and details may be made thereto without departing from the spirit and scope of the present inventive concept as set forth by the following claims.

What is claimed is:

1. A semiconductor chip, comprising:
a hardware performance monitor (HPM) unit disposed in the semiconductor chip, and configured to be driven during an initial operation period, a first operation period, and a second operation period, which do not overlap one another, and to output initial HPM data, first HPM data, second HPM data in the initial operation period, the first operation period, and the second operation period, respectively; and
an HPM controller disposed in the semiconductor chip, and configured to receive the initial HPM data from the HPM unit in the initial operation period and store the received initial HPM data in a storage unit, to perform a first compensation operation of receiving the first HPM data in the first operation period and compensating a driving voltage of the semiconductor chip using the initial HPM data, and to perform a second compensation operation of receiving the second HPM data in the second operation period and compensating the driving voltage of the semiconductor chip using the initial HPM data,
wherein a first voltage, which is different from the driving voltage, is supplied to the semiconductor chip in the initial operation period, the first operation period, and the second operation period,
the HPM unit is turned on in the initial operation period, the first operation period, and the second operation period, the HPM unit provides the initial HPM data, the first HPM data, and the second HPM data, which are correlated with performance of the semiconductor chip, to the HPM controller in a first mode, and the HPM unit does not provide the initial HPM data, the first HPM data, and the second HPM data to the HPM controller in a second mode.

2. The semiconductor chip of claim 1, wherein the HPM unit operates in the first mode in a first section of the initial operation period, a first section of the first operation period, and a first section of the second operation period, each of the first sections of the initial operation period, the first operation period, and the second operation period is included in a booting period of the semiconductor chip, and the HPM controller receives the initial HPM data from the HPM unit in the first section of the initial operation period and stores the received initial HPM data in the storage unit, performs the first compensation operation in the first section of the first operation period, and performs the second compensation operation in the first section of the second operation period.

3. The semiconductor chip of claim 2, wherein the initial operation period includes a second section of the initial operation period, which does not overlap the first section of the first operation period, the first operation period includes a second section of the first operation period, which does not overlap the first section of the first operation period, the second operation period includes a second section of the second operation period, which does not overlap the first section of the second operation period, and the HPM unit operates in the second mode in the second section of the initial operation period, the second section of the first operation period, and the second section of the second operation period.

4. The semiconductor chip of claim 3, wherein the second section of the initial operation period, the second section of the first operation period, and the second section of the second operation period each includes a third section and a fourth section, the third section is included in the booting period of the semiconductor chip, the fourth section is a driving period of the semiconductor chip and is a remaining period in each of the initial operation period, the first operation period, and the second operation period, excluding the booting period, the semiconductor chip is driven by the driving voltage in the fourth section of the initial operation period, the semiconductor chip is driven by a driving voltage compensated by the first compensation operation in the fourth section of the first operation period, when a difference between the initial HPM data and the first HPM data is greater than a critical value, and the semiconductor chip is driven by a driving voltage compensated by the second compensation operation in the fourth section of the second operation period, when a difference between the initial HPM data and the second HPM data is greater than the critical value.

5. The semiconductor chip of claim 1, wherein the HPM unit operates in the first mode in a first section of the initial operation period, a first section of the first operation period, and a first section of the second operation period, the semiconductor chip is not driven during a first power-off period between the initial operation period and the first operation period and a second power-off period between the first operation period and the second operation period, the first section of the initial operation period is included in an initial booting period of the semiconductor chip, the first section of the first operation period includes a start point at which the first operation period starts after the first power-off period is passed, and the first section of the second operation period includes a start point at which the second operation period starts after the second power-off period is passed.

6. The semiconductor chip of claim 5, wherein the initial operation period includes a second section of the initial operation period, which does not overlap the first section of the first operation period, the first operation period includes a second section of the first operation period, which does not overlap the first section of the first operation period, the second operation period includes a second section of the second operation period, which does not overlap the first section of the second operation period, and the HPM unit operates in the second mode in the second section of the initial operation period, the second section of the first operation period, and the second section of the second operation period.

7. The semiconductor chip of claim 1, wherein the first compensation operation includes an operation of performing the compensation for the driving voltage, when a difference between the initial HPM data and the first HPM data is greater than a critical value; and the second compensation operation includes an operation of performing the compensation for the driving voltage, when a difference between the initial HPM data and the second HPM data is greater than the critical value.

8. The semiconductor chip of claim 7, wherein the HPM controller maintains the driving voltage of the semiconductor chip, when the difference between the initial HPM data and the first HPM data and the difference between the initial HPM data and the second HPM data are less than or equal to the critical value.

9. The semiconductor chip of claim 1, wherein the HPM controller stores the first HPM data and the second HPM data in the storage unit.

10. An electronic apparatus, comprising:

a semiconductor chip configured to operate in first and second sections; and a kernel configured to provide, to the semiconductor chip, a booting voltage for booting the electronic apparatus during a first booting period of the electronic apparatus and a driving voltage for driving the semiconductor chip after the first booting period during a first driving period of the electronic apparatus, wherein the semiconductor chip includes:

a hardware performance monitor (HPM) unit configured to output first HPM data in the first section; and an HPM controller configured to receive the first HPM data from the HPM unit and output one of a first compensation signal for compensating the driving voltage of the semiconductor chip or a second compensation signal for maintaining the driving voltage of the semiconductor chip using initial HPM data, wherein the booting voltage includes first and second voltages, wherein the first booting period includes the first section in which the first voltage is provided from the kernel and a third section, which is a part of the second section, in which the second voltage is provided from the kernel, and wherein the second section includes a fourth section, which is a remaining part of the second section excluding the third section.

11. The electronic apparatus of claim 10, further comprising:

a storage unit configured to store the initial HPM data, wherein the electronic apparatus is powered off after an initial booting period before the first booting period, the kernel provides the first voltage to the semiconductor chip during the initial booting period, the HPM unit outputs the initial HPM data during the initial booting period, and the HPM controller receives the initial HPM data from the HPM unit during the initial booting period and stores the received initial HPM data in the storage unit.

12. The electronic apparatus of claim 11, wherein the HPM unit is turned on during the first booting period, the first driving period, and the initial booting period, and is turned off when the electronic apparatus is powered off.

13. The electronic apparatus of claim 10, further comprising:

a voltage regulator configured to receive the first compensation signal from the HPM controller and provide a compensation voltage to the semiconductor chip in response to the first compensation signal, wherein the electronic apparatus is powered off during a power off period that is after an initial booting period and before the first booting period, the kernel provides the driving voltage to the semiconductor chip during an initial driving period between the initial booting period and the power off period, the semiconductor chip receives the driving voltage and the compensation voltage during the first driving period when the HPM controller outputs the first compensation signal, and the semiconductor chip receives the driving voltage and does not receive the compensation voltage during the first driving period when the HPM controller outputs the second compensation signal.

14. The electronic apparatus of claim 10, wherein the HPM unit is turned on during the first booting period and the first driving period.

15. The electronic apparatus of claim 10, wherein the kernel provides the booting voltage to the semiconductor chip during a second booting period that does not overlap the first driving period, the HPM unit outputs second HPM data in a first section of the second booting period, the HPM controller receives the second HPM data from the HPM unit and outputs one of the first compensation signal or the second compensation signal using the initial HPM data, and the first voltage is provided from the kernel in a third section of the second booting period.

16. A method of operating an electronic apparatus including a semiconductor chip, the method comprising:

determining whether booting of the electronic apparatus is initial booting;

extracting initial hardware performance monitor (HPM) data and storing initial HPM data in a first section of an initial booting period when it is determined that the booting of the electronic apparatus is initial booting;

extracting first HPM data and storing the first HPM data in a first section of a first booting period when it is determined that the booting of the electronic apparatus is not the initial booting; and outputting one of a first compensation signal and a second compensation signal using the initial HPM data and the first HPM data, wherein the first booting period is after the initial booting period, a driving voltage of the semiconductor chip is compensated in response to the first compensation signal, and the driving voltage of the semiconductor chip is maintained in response to the second compensation signal.

17. The method of claim 16, further comprising:

determining whether rebooting of the electronic apparatus is performed;

extracting second HPM data and storing the second HPM data in a first section of a second booting period when it is determined that rebooting of the electronic apparatus is performed; and outputting one of the first compensation signal and the second compensation signal using the initial HPM data and the second HPM data.

18. The method of claim 16, wherein outputting one of the first compensation signal and the second compensation signal comprises:

comparing a difference between the initial HPM data and the first HPM data with a predetermined critical value;

outputting the first compensation signal when the difference is greater than the critical value; and outputting the second compensation signal when the difference is less than or equal to the critical value.

19. The method of claim 16, wherein a first voltage is provided to the semiconductor chip during the first section of the first booting period, a second voltage that is greater than the first voltage is provided to the semiconductor chip during a third section of the first booting period, the third section is a remaining part of the first booting period excluding the first section, and the second voltage is a voltage for booting the electronic apparatus.

20. The method of claim 19, wherein the semiconductor chip includes an HPM unit configured to provide the initial HPM data and the first HPM data, the HPM unit is set to a first mode in response to the first voltage, the HPM unit is set to a second mode in response to the second voltage, and the HPM unit does not provide the initial HPM data or the first HPM data in the second mode.

* * * * *